April 29, 1924.

W. J. SIMANEK

SCALE HOLDER

Filed Aug. 6, 1921

1,492,002

INVENTOR,
Wencel J. Simanek
BY Morsell and Keeney
ATTORNEYS

Patented Apr. 29, 1924.

1,492,002

UNITED STATES PATENT OFFICE.

WENCEL J. SIMANEK, OF RACINE, WISCONSIN.

SCALE HOLDER.

Application filed August 6, 1921. Serial No. 490,400.

*To all whom it may concern:*

Be it known that I, WENCEL J. SIMANEK, a citizen of the United States, and resident of Racine, in the county of Racine and State of Wisconsin, have invented new and useful Improvements in Scale Holders, of which the following is a description, reference being had to the accompanying drawings, which are a part of this specification.

This invention relates to improvements in scale holders intended particularly for holding the measuring scales for use in machine and pattern shops in connection with making patterns, laying out castings, and for various other uses.

One of the objects of the invention is to provide a holder of such construction that the scale will be yieldably and preferably also slidably mounted on the holder so that the scale may be placed in any desired position relative to the holder, or, if desired, scales of different sizes and with different graduations may be interchangeably mounted on the holder.

The invention contemplates providing a guideway on a substantially vertical supporting member, the guideway having shoulders against which one edge of the scale abuts; and a further object of the invention is to provide one or more bolts yieldingly mounted on the supporting member in such a manner that the heads of the bolts engage the opposite edge of the scale without covering any portion of the face of the scale.

A more specific object of the invention is to provide one or more slots in the supporting member extending substantially at right angles to the guideway provided thereon for the scale, in which slots the bolts for holding the scale in the guideway are mounted, springs preferably being interposed between the nuts on the bolts and the supporting member, thus providing an arrangement whereby scales varying somewhat in width may be firmly held in the desired position on the supporting member.

A further object of the invention is to provide an indicating pointer in combination with the scale so arranged that measurements may be taken on the scale from either side of the pointer, the pointer preferably being formed of resilient material and mounted in a guideway on the supporting member in parallel arrangement with the guideway for the scale.

A further object of the invention is to provide a vertically extending bar mounted on the supporting member and which is provided with a laterally extending arm rotatable in relation thereto and which may be used either as a support for a lamp, or a surface gauge scriber swivel.

The invention consists in the novel constructions, arrangements and devices to be hereinafter described and claimed for carrying out the above stated objects and such other objects as will appear from the following description of a certain preferred embodiment illustrated in the accompanying drawings, wherein—

Figure 1:
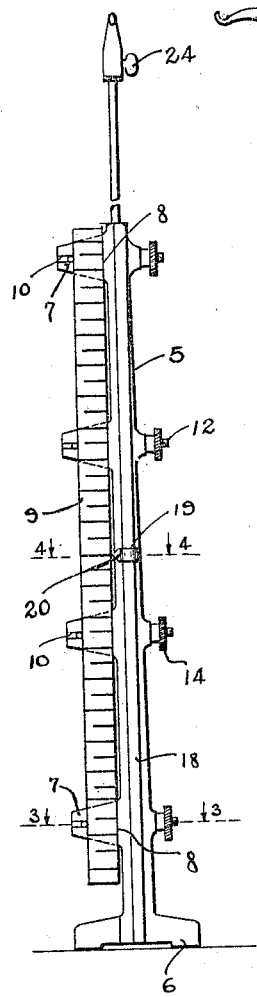
Fig. 1 is a front elevational view of a device embodying the principles of the invention.
Figure 2:
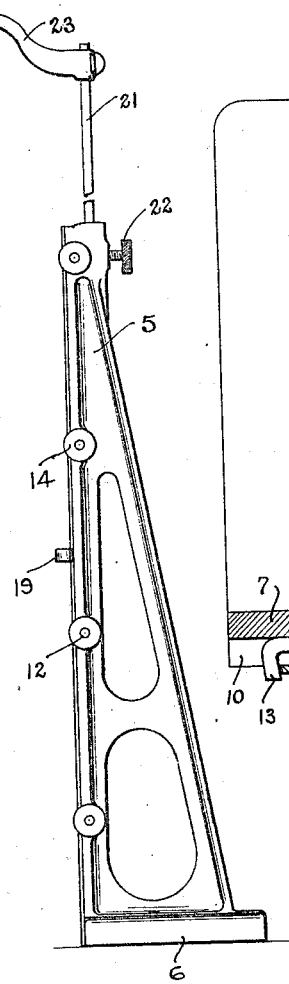
Fig. 2 is a side elevational view thereof.
Figure 3:
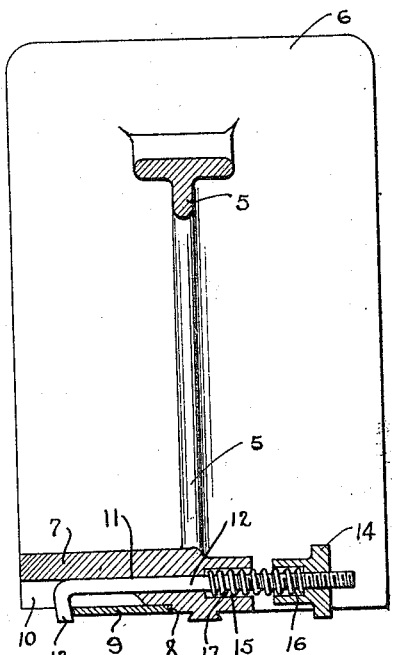
Figure 4:
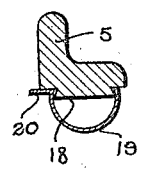

Figs. 3 and 4 are sectional views, on an enlarged scale, taken on the lines 3—3 and 4—4, respectively, of Fig. 1.

Like characters of reference designate like parts in the several views.

Referring now to the drawings, the supporting member 5 is preferably formed integrally with a base plate 6 and is provided with a plurality of laterally extending lugs 7 which are formed with aligned shoulders 8 against which one edge of a vertically positioned scale 9 abuts, the shoulders 8 being formed perpendicular to the base plate 6.

The lugs 7 are each provided with a horizontally extending slot 10 and the supporting member with a similarly extending registering aperture 11 which slot and aperture are adapted to receive a bolt 12 the outer end of which is bent around substantially at right angles to form a hook portion 13 adapted to bear against the edge of the scale opposite to that bearing against the shoulders 8, the other end of the bolt being screw threaded for a thumb nut 14. The supporting member 5 and the nut 14 are recessed at 15 and 16, respectively, for the reception of a spring 17 coiled about the bolt 12 and interposed between the nut and the supporting member. It will thus be seen that the bolts 12 are relatively free to move toward or away from the respective shoulders 8 whereby the scale 9 may be moved to any desired position relative to the supporting member and, scales of different width, if desired, and having different graduations, may be interchangeably mounted on the supporting member. By this arrangement the full face of the scale is visible at all times and the scale is held precisely at right angles to the base plate. By means of my device and suitable calipers measurements which are ordinarily difficult to obtain may be conveniently and accurately obtained.

The supporting member preferably is also provided with a guideway 18 which extends substantially parallel with the guideways for the scale and which is adapted to be embraced by a resilient U-shaped member 19 provided with a pointer 20, the pointer extending close to the adjacent edge of the scale 9. The pointer and scale may be arranged so that the pointer will indicate the center line of the work or object to be scaled which permits measurements to be taken on the scale either above or below the pointer, as may be desired.

The supporting member is preferably provided with a vertically extending socket in its upper end which is adapted to receive a similarly extending rod or bar 21, the bar being secured in the socket by means of a set screw 22. On the upper end of the bar 21 is a laterally extending arm 23 rotatably mounted on the bar and which may be secured in any desired position thereon by a thumb nut 24. The bar 23 may be used for supporting an incandescent lamp to illuminate the scale and pointer, or it may be used for a surface gauge scriber swivel, and used as a surface gauge.

I claim:

1. A device of the class described comprising a supporting member provided with a guideway, a scale slidable in said guideway, said guideway including a bearing portion against which one longitudinal edge of the scale abuts, an axially displaceable bolt positioned on said member substantially at right angles to said guideway, the head of said bolt being in engagement with the opposite edge of said scale, a nut on said bolt, and a spring interposed between said nut and said member for the purpose described.

2. A device of the class described comprising a supporting member provided with a guideway, a scale slidable in said guideway, said guideway including a bearing portion against which one longitudinal edge of the scale abuts, said member having a plurality of bolt receiving slots extending substantially at right angles to said guideway, bolts in said respective slots, the heads of said bolts being in engagement with the opposite longitudinal edge of said scale, a nut on each of said bolts, and a spring interposed between each of said nuts and said member for the purpose described.

In testimony whereof, I affix my signature.

WENCEL J. SIMANEK.